United States Patent [19]

Kharsas et al.

[11] 4,252,603
[45] Feb. 24, 1981

[54] PREPARATION OF ASBESTOS FIBERS

[75] Inventors: Nicholas Kharsas, Elsternwick;
Philip S. B. Stewart, Beaumaris, both of Australia

[73] Assignees: ICI Australia Limited, Melbourne; Woodsreef Mines Limited, New South Wales, both of Australia

[21] Appl. No.: 3,514

[22] Filed: Jan. 15, 1979

[30] Foreign Application Priority Data

Jan. 20, 1978 [AU] Australia ............................... PD3091

[51] Int. Cl.³ ............................................. C03B 37/00
[52] U.S. Cl. ......................................... 162/3; 162/72; 162/76; 162/153; 162/155; 106/99
[58] Field of Search ................................ 162/153, 155; 106/308 O, 308 F, 308 N, 308 S

[56] References Cited

U.S. PATENT DOCUMENTS

| | | | |
|---|---|---|---|
| 2,593,125 | 4/1952 | Eaton et al. | 162/153 |
| 3,957,571 | 5/1976 | Bodycomb | 162/155 |
| 3,965,284 | 6/1976 | Xanthos et al. | 162/155 |

*Primary Examiner*—James Poer
*Attorney, Agent, or Firm*—Cushman, Darby & Cushman

[57] ABSTRACT

A process of separating fibres from asbestos-bearing material which process comprises the steps by treating said asbestos-bearing material with a chemical agent capable of reacting with, or adsorbing on, asbestos fibres to form a dispersion, and agglomerating said dispersion, and wherein effluents containing said chemical agent are subjected to ultrafiltration prior to re-use in the process. The process given high yields of novel fibres characterized in that the said fibres provide reinforcement in cementitious compositions.

22 Claims, 2 Drawing Figures

PREPARATION OF ASBESTOS FIBERS

This invention relates to wet processes used in the treatment of asbestos-containing materials, and more particularly it relates to the use of surfactants in processes for recovering asbestos fibres in high yield and in a form suitable for the manufacture of asbestos cement.

Asbestos is a term applied to a number of fibrous mineral silicates which may be divided into two large groups, one of which is known as amphibole which contains as sub-divisions minerals such as anthophyllite, amosite, crocidolite, tremolite or actinolite, and the other which is referred to as serpentine or chrysotile. Chrysotile constitutes the bulk of that used industrially and is to be found as a mineral deposit in many countries such as Canada, United States of America, Italy, South Africa, Russia and Australia.

A consequence of the different circumstances of formation of the chrysotile and its subsequent geological history is that the chrysotile fibres from different sources may have differences in composition or texture, in fibre dimensions or tensile strengths, or in other properties. The usual mode of occurrence of chrysotile is a "cross fibre" arrangement in which bundles of fibres are closely packed together and set at right angles to the walls of cracks and fissures that extend through the host rock of the ore body. To obtain a useful product from the ore requires, firstly, the liberation of the fibrous component and separation from it, as far as economically practicable, of the associated rock particles which detract from the product quality and value, and secondly the fiberising of fibre bundles to give smaller diameter fibres with maximum conservation of fibre length.

The material in some deposits may comprise relatively short length fibres or may be unusually resistant of fiberising by conventional dry milling practices. As a result the proportion of the potentially available fibre which can be recovered in commercially useful form is reduced substantially and the economic feasibility of processing is adversely affected.

The vigorous breaking and grinding of solid rock masses to release fibre bundles leads to extensive breaking of the longer fibres and consequent economic losses. Many attempts have been made to improve the conventional processes to maximize the production of the longer fibres but these have only been partially successful.

It is an object of our invention to provide an improved process for separating asbestos fibres from asbestos-bearing material wherein the breaking of the longer fibres is minimized.

A disadvantage of all conventional dry crushing processes is that during milling dust is produced in the form of rock and fibre fines in large quantities. Huge baghouse installations have to be employed to provide satisfactory working conditions by reducing dust and recirculating clean filtered air. Workers are regularly examined and x-rayed by medical staff, and a medical history of each worker established. Workmen are provided with suitable dust maskes to protect the nasal passages and lungs from inadvertent exposure to dust. These masks require regular inspections and sterilizations. Some workmen are found to be allergic to the dusts and to be transferred to alternative work.

It is a further object of our invention to provide a process for separating asbestos fibres from asbestos-bearing material wherein the dust hazards that are associated with conventional processes are considerably reduced.

It has been found that for certain deposits the conventional treatment is comparatively ineffective. For example, with certain asbestos-containing deposits such as are found in some areas in Australia, the veins of chrysotile have been converted to a state in which some of the asbestos remains persistently as comparatively large bundles of fibres throughout the processing. Hitherto it has not been advantageous commercially to recover the fibre content of such bundles or spicules in a form which was useful.

It is a yet further object of our invention to provide a process for separating asbestos fibres from asbestos-bearing material that cannot be satisfactorily treated by conventional process.

Various classification schemes are used to describe the grades of the fibre products from asbestos mills, but that adopted by the Quebec Asbestos Producers Association is widely recognized. Broadly the classification involves nine groups having decreasing fibre lengths.

Groups 1, 2 and 3 cover various spinning grades used for textile production. Groups 4 to 6 are medium length fibres which are used for asbestos-cement production, the longer grades attracting higher prices. Group 4 is preferred for asbestos-cement production, Group 5 is called the "paper stock grade" and Group 6 is largely limited to paper and shingle production.

Group 7 consists of "shorts and floats", and Groups 8 and 9 are used as sands and gravel.

The greatest part of the asbestos produced through out the world is consumed in the manufacture of asbestos-cement products. Consequently considerable effort has been expended in trying to develop better methods of recovering the grades suitable for this application.

This is particularly true for areas containing the difficult ore deposits described above. In such cases the commercial dry fiberising operations give yields of only 2-6% w/w (based on mill feed) of fibre of grades suitable for asbestos-cement manufacture.

It is a still further object of our invention to provide a process of separating from ores asbestos fibre suitable for asbestos-cement manufacture, in greater yields than have been obtained in conventional processes from these ores.

It is another object of our invention to provide a process for obtaining asbestos fibres from a wide range of asbestos-bearing materials, for example, crude ore, mill feed, selected streams from conventional dry and wet processes, tailings, mine wastes, and low grade short fibre.

It has been proposed that in processes in which asbestos-bearing rock is treated by a wet process, that such processes use surface active agents, commonly referred to as surfactants, as processing aids. It has also been proposed that such surfactants be recovered at various stages of such a process in the form of dilute solutions and recirculated and reused in this form in wet crushing, or hydraulic classification, or chemical treatment steps of the process. It is a further object of the present invention to provide a process for recovering asbestos fibre in which surfactant material is used as a processing aid and wherein recovered liquid surfactant-bearing compositions are concentrated to increase their surfactant content prior to their reuse in the process. It is a still further object of the invention to provide such a process wherein the surfactant-bearing compositions are concentrated using technology relating to ultra-filtration.

We have now discovered a process which satisfies the above objects. The novel asbestos fibres from the process of our invention comprise asbestos fibres and agglomerates of fibres and fibrils which retain a fibrous character and which may have up to 20% w/w of surfactant adsorbed on or absorbed in the asbestos, but usually contain less than 10% w/w of residual surfactant.

It is a particular and surprising feature of the process of our invention that the fibres obtained are novel, and have new properties including the ability to impart good strength in cementitious compositions. Because of the new nature of our fibres this ability to reinforce cementitious compositions may not be correctly indicated by some of the conventional tests used to grade asbestos fibres. Evaluation of this property by forming asbestos-cement plaques or sheets in accordance with the standard procedures employed in the industry and measuring the characteristics of this asbestos-cement, is the most directly relevant method.

When our process is applied to ores capable of yielding 2-6% w/w of asbestos-cement grade fibre when treated by the prior art wet and dry process, yields of 8-15% w/w acceptable fibre are obtained.

Similar yield improvements are obtained when the process is applied to the softer, more easily treated ores.

It is a particular feature of our invention that the process can be applied to low grade short fibre that is unacceptable for use in asbestos-cement compositions, to produce an elongated agglomerated fibre of length substantially greater than the fibre from which it was derived, and wherein said elongated agglomerated fibre provides reinforcement of cementitious compositions.

Further advantages associated with the fibres of our invention are that they can be shipped in a moist condition from the processing plant and used directly in forming cementitious compositions without pre-grinding, thus also avoiding the generation of potentially harmful air-borne dusts during handling.

While the more specific embodiments of this invention are directed to fibres for the manufacture of asbestos-cement articles by filtration of particulate materials from a slurry comprising asbestos fibres and hydraulic cement, it is to be understood that the broader aspects include fibres for the manufacture of a variety of asbestos-containing articles, including those derived by extrusion processes.

Accordingly we provide a process of separating fibre from asbestos-bearing material which process comprises the steps of contacting said asbestos-bearing material with a surfactant to form a dispersion, agglomerating said dispersion, and recovering fibre, characterized in that a first surfactant composition from the recovery step is treated by ultrafiltration means in a manner such that there is provided a second composition which contains a higher concentration of surfactant than does the said first composition. The ultrafiltration means suitably comprise membrane filter material of the type used to filter substances of high molecular weight. Concurrently with the preparation of the said second composition there is a third composition, referred to hereinafter as a permeate composition, which has passed through the membrane material and which contains a lower concentration of surfactant than does the first composition referred to above. The second composition referred to above can be used as a source of surfactant for the said contacting step, and may be further concentrated by similar means if desired, prior to such use. The permeate composition may also be concentrated by similar means to convert it to a further source of surfactant for use in the contacting step.

A wide variety of asbestos-bearing materials may be treated by the process of our invention to give improved yields of fibre suitable for reinforcement of cementitious products or to utilise otherwise waste material. These include raw ore, partially classified mill feed, tailings from conventional processes, mine wastes, and fibre concentrates from either wet or dry processes. The actual sequence of operations in our process and the number of auxiliary steps for any particular asbestos-bearing material is determined by the necessity to liberate fibre from non-fibrous particles, or to separate from the product, at various convenient stages, the grit, dust, unopened fibres or other material which would lower the performance of the product below the desired level.

In one embodiment of the invention there is provided a process for recovering asbestos fibres from asbestos-bearing material which process comprises first, subjecting said material to wet crushing and hydraulic classification, optionally in the presence of surfactant, secondly treating the classified material with surfactant to produce a dispersion of fibres, thirdly adding a diluent to said dispersion to provide an aggregation of fibres located in a liquid medium containing surfactant material, fourthly separating said aggregation of fibres from said medium so as to recover said fibres and to provide a mother liquor which contains surfactant material, and fifthly subjecting said mother liquor to a process comprising an ultrafiltration step wherein said mother liquor is passed through a membrane to form a permeate composition which contains a lower concentration of surfactant material than does the said mother liquor, and to form a recoverable composition containing a higher concentration of surfactant than does the said mother liquor. The recoverable composition which is enriched with respect to surfactant and which is obtained in the process of the invention is useful as a processing aid in processes relating to the recovery of asbestos form asbestos-bearing material.

The most useful diluent for our process is water which is usually readily available, inexpensive, safe, does not pose disposal problems, and is an excellent solvent for most of the chemical agents useful in our process. Repeated reference to water and aqueous solutions is made throughout this specification but this is not to be understood as limiting, since other solvents or co-solvents such as alcohols can be used.

When the process is presented with a clean fibre concentrate, albeit of short or lower grade fibre, the required number of steps may be as follows:

(a) Contacting the asbestos-bearing material with an aqueous solution of a suitable surfactant to form a slurry.

(b) Fiberising the solids in the slurry with the aid of a suitable mechanical device.

(c) Coagulation of the dispersed fibre to form stringy fibre agglomerates.

(d) Dewatering to provide a mother liquor suitable for treatment by an ultrafiltration step.

(e) Ultrafiltration to provide a recyclable surfactant-rich composition and a relatively surfactant-free composition.

In another embodiment of our invention the process is used to treat run-of-mine ore. Additional stages are needed, and typically the process as applied to chrysotile-containing ore comprises the following steps:

(1) a crushing step to convert the asbestos-bearing material to mill feed, (2) a screening and gravity separation step to remove large grit (typically larger than 10 mesh) containing little asbestos, (3) a wet grinding or crushing step to liberate and partially open the asbestos fibre bundles, (4) a first classification step to produce a fibrous concentrate from which particles of non-fibrous components have been substantially removed, (5) a dewatering step, (6) a contacting step where the partially-opened fibre bundles are treated with a suitable chemical agent, (7) a fiberising step, (8) a dilution step, to reduce slurry viscosity sufficiently for further classification, (9) a second classification step to further remove unwanted grit,

(10) a slurry dilution step to induce coagulation of fibres and form stringy fibre agglomerates,

(11) a third classification step to remove residual particles of unfiberised materials and some of the shortest fibres, if required, and

(12) a dewatering step,

(13) one or more ultrafiltration steps to provide a recyclable surfactant-rich composition and a relatively surfactant free composition.

The product from the dewatering step above may be dried prior to being transported in dry form to the site of manufacture of the asbestos-containing articles. Alternatively, and with reduction of dust hazards, the product may be transported in a moist condition. In yet another embodiment a partial dewatering stage is used and the partially de-watered product used directly to prepare the compositions used for making asbestos-containing articles.

This process scheme will now be discussed in more detail to illustrate and to indicate preferred and optional embodiments of our invention.

When the raw material for the process is mined ore, the initial crushing (1) is that normally used for the conventional dry crushing of asbestos-containing rock. The feed is selected by passing through a screen, and this is typically of −3/8 inch mesh. Wet crushing may also be used for this stage.

The fibre-containing solids are subjected to a wet grinding step (3) and the solids content of the slurry during grinding is typically 20 to 70% by weight. In one embodiment of our invention a dilute solution of a surfactant is introduced during this wet grinding step.

While the surfactant for this step need not be the same as that used for the subsequent contacting step (6), it is an advantageous feature of our invention that it is possible to recycle to this stage process solution containing excess surfactant separated from the fibre product at a later stage of the process. This is a practical convenience in avoiding the need to dispose of solutions, reducing chemical agent and water usage, and thus is of considerable economic value.

The aqueous slurry of solids from this milling stage (3) is subjected to a first classification (4) for the purpose of producing a fibre concentrate for subsequent chemical treatment, by removing non-fibrous particles from the main process stream. The purpose of this step is to maximise both the retention of fibre and the elimination of gangue.

This classification step (4) may involve sequential use of several similar or different types of hydraulic classifiers. The coarsest particles may be first separated by wet screening or by use of slime/sand separators such as spiral, bowl, or hydraulic cone classifiers, and then subjected to further treatment, such as a wet shaking table or hydrocyclone, to recover fibre-containing particles from this stream.

The stream carrying the smaller particles is subjected similarly to further stages of hydraulic classification, using, for example, hydrocyclones. The fibre-containing solids fractions so separated may be accumulated as a single fibre concentrate or presented separately to the subsequent steps of the process.

The fibre containing fractions from the classification step (4) may be mixed prior to the dewatering step (5) with process solutions containing surfactant, recycled from the later ultrafiltration stages of the process.

The opening of the fibre bundles to produce fibres, in the presence of a selected solution of surfactant may be carried out in two distinct stages, i.e., contacting (6) and fiberising (7), or these stages may be essentially combined so that they are concurrent and the time of contacting is comparatively short. The choice of conditions for stages (6) and (7) is a matter of experiment and depends substantially on the nature of the asbestos-bearing raw material entering the process.

In the contacting step (6) the fibrous solid from the classification stage is suspended in a solution containing the appropriate amounts of the surfactant or surfactants referred to hereinafter, the quantities of solids, surfactants and water being selected according to the degree of fiberisation required and viscosity of the resultant slurry. This slurry is optionally allowed to stand quiescent or with gentle agitation for a period of time to facilitate wetting and penetration of the solids by the solutions and to promote incipient fiberising. The optimum period of time is established by core laboratory experiments for the particular crude ore. The slurry is then subjected in the fiberising step (7) to the action of a suitable device providing sufficient energy to the system to separate the fibre bundles into smaller diameter fibres or fibrils with minimum shortening of length. This can be done, for example, by means of a ball mill, high speed macerator, colloid mill, or ultrasonic disintegrator.

In a preferred embodiment the contacting step (6) is carried out at elevated temperatures. For example, at 90° C. the time required for fiberising the solids is significantly reduced and less severe application of mechanical energy is required, which is beneficial to retaining length in the resultant fibres. Temperatures above 100° C. can be employed using an autoclave at elevated pressures. The upper limit for the temperature is near 300° C.–400° C. but we prefer to operate below 200° C. In practice the selection of the best temperature/time conditions is largely an economic consideration for any particular ore. The elevated temperature conditions can also be maintained during the fiberising step with advantage.

The ratio by weight of water to solids in the contacting stage is in the range 1:2 to 20:1, preferably in the range 3:2 to 6:1. According to the nature of the fibre concentrate being treated and the type of fiberising device being used, additional water or recycled surfactant solution may be added in the fiberising step. The necessity to pump slurries from one process stage to another can put practical limits on the viscosity which can be tolerated.

The surfactants added in the contacting stage (6) for promoting the fiberising (7) of the chrysotile may be ionic or nonionic in character or mixtures of the two types. They are characterised in that they react with or are adsorbed on the surfaces of the asbestos fibres and consequently facilitate the opening of the fibres under the influence of the mechanical fiberising devices, and maintain the fibres in stable dispersion. The initial concentration of the surfactants in the water is more than 0.01% w/w and preferably more than 1% w/w in the contacting stage and preferably also in the fiberising stage. Incremental additions of the chemical agents can be made during these stages to maintain or increase the concentration.

Preferably the chemical agents are surfactants and are selected from the classes of anionic, cationic, nonionic, and amphoteric surfactants. We have found that ionic surfactants or mixtures containing them are particularly useful. The most preferred surfactants are of the anionic type and mixtures of anionic and non-ionic types. Where mixtures of surfactants are used they may be added together in the processing or added in sequence when this is beneficial to either the fiberising, the subsequent coagulation, or the properties of the final product. In the latter case, for example, the mixture of surfactants may be chosen to facilitate the redispersion of the fibres in making cementitious compositions such as asbestos cement.

The concentration and conditions required for optimum fiberising vary according to both the nature of the surfactant and of the chrysotile. Because of its effects on the surface charge of the chrysotile, the pH of the solution influences the surfactant adsorption. Amphoteric types of surfactants may display either anionic or cationic character according to the pH of the system. Mixtures of surfactants of the same type, for example, anionic, can be beneficial in optimising the overall process.

The surfactant or surfactants for our process may be selected from among the following groups of anionic surfactants: carboxylates, N-acylsarcosinates, alkanesulphonates, linear and branched alkylarylsulphonates, dialkyl sulphosuccinates, arylsulphonates, naphthalene-sulphonates, N-acyl-N-alkyl-laurates, 2-sulphoethyl esters of fatty acids, olefin sulphonates, alkyl sulphates, sulphated natural oils, sulphated alkylphenol alkoxylates, and phosphate esters of alkanols and phenol and alkylphenol alkoxylates.

The carboxylates, sulphates, sulphonates, and phosphates may be in any of the derivative forms known to those skilled in the art, as for example, the free acid, metal salts such as the magnesium and sodium salts, ammonium and substituted ammonium salts, and esters. Typical substituted ammonium salts are those derived from mono-, di- and triethanolamine. We prefer to use the sodium salts since they are readily available and generally are convenient to use because they have good water solubility.

The preferred anionic surfactants are those with long chain alkyl groups such as, for example, nonyl, decyl, dodecyl, tridecyl, stearyl, cetyl, palmityl and myristyl.

Thus typical carboxylates that give good results with our process are sodium oleate and sodium laurate. Preferred N-acylsarcosinates are those with the acyl group selected from the group consisting of cocoyl, lauroyl, stearoyl and tall oil acyl.

Typical examples of suitable sulphates and sulphonates are ammonium lauryl sulphate, diethanolamine lauryl sulphate, sodium cetyl sulphate, dodecylbenzenesulphonic acid, sodium dodecylbenzenesulphonate, triethanolamine dodecylbenzene sulphonate, tridecylbenzenesulphonic acid, nonylnaphthalenesulphonic acid, sodium butylnaphthalenesulphonate, sodium tetrahydronaphthalenesulphonate, and $\alpha$-olefin sulphonate.

The most preferred sulphonates are those derived from sulphosuccinic acid. They are conveniently used in the form of sodium slats of the esterified acids. Specific membranes of this group that we have found very useful are sodium dihexyl sulphosuccinate, sodium di(isobutyl)sulphosuccinate, sodium dioctylsulphosuccinate, magnesium dioctylsulphosuccinate, disodium N-octadecyl-sulphosuccinamate, tetrasodium N-(1,2-dicarbethoxyethyl)N-octadecyl sulphosuccinamate, and the sodium sulphosuccinate esters of lauric mono- and di-ethanolamides or of ethoxylated lauryl or decyl alcohols.

Suitable phosphate esters include "Teric" 305 and 306 (alkyl ether phosphates; "Teric" is a Registered Trade Mark).

Suitable cationic surfactants comprise the mono-, di-, and polyamines, amine oxides, alkoxylates of alkyl and alicyclic amines, 2-alkyl-1-(hydroxyethyl)-2-imidazolines, tetrakis-substituted ethylenediamines, amide-linked amines, and quaternary ammonium salts.

Cationic surfactants which we have found particularly useful include "Cetrimide" (cetyltrimethylammonium bromide), "Vantoc" CL (lauryl-dimethyl benzylammonium chloride), "Monfluor"71, and "Fixinol" (cetyl pyridinium bromide). "Cetrimide", "Vantoc", "Monfluor" and "Fixinol" are Registered Trade Marks.

Suitable non-ionic surfactants for the process of our invention may be selected from among fatty acid esters, alkoxylated aliphatic alcohols and alkylphenols, alkoxylates, fatty acids and fatty acid amides, and natural fats and oils.

Preferred aliphatic alcohols are selected from the group consisting of ethylene glycol, propylene glycol, glycerol, oleyl alcohol, lauryl alcohol, cetyl alcohol, stearyl alcohol, tridecyl alcohol, myristyl alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alcohols, tallow and sorbitan, and preferred alkylphenols are selected from the group consisting of nonylphenol, dodecylphenol, octylphenol, isooctylphenol, and $C_k$–$C_{12}$-alkyl-phenols. The preferred fatty acids are lauric acid, stearic acid, oleic acid, coco acid, capric acid and myristic acid.

The carboxylic esters comprise those derived from carboxylic acids selected from the group consisting of lauric acid, stearic acid, oleic acid, coco acid, palmitic acid, ricinoleic acid, tall oil, soybean oil, rosin, tallow, lard, cottonseed, and safflower oil, and from alcohols selected from the group consisting of glycerol, sorbitan, ethylene glycol, diethylene glycol, propanediol, and poly(oxyethylene).

We prefer that the alkoxylates be ethoxylates. The amines used to prepare the fatty acid amides are selected from the group consisting of ethanolamine, diethanolamine, and isopropanolamine.

Non-ionic surfactants which we have found particularly useful include the glycol esters of oleic and lauric acid, ethoxylated nonyl phenols, polyethyleneglycol methacrylate, and "Teric" 9A8 (an ethoxylated aliphatic alcohol).

Suitable amphoteric surfactants are substituted aminoacids, such as N-coco-3-aminopropionic acid, disodium N-lauryl-2-iminodipropionate, N-carboxymethyl-N-cocoalkyl-N,N,dimethylammonium hydroxide, the sodium salt of N-hydroxyethyl-N-lauromido-β-alanine, and substituted 2-imidazolinium hydroxides.

The concentration of the surfactant in the water is chosen so that with the particular water to solids ratio, the amount of surfactant is sufficient to disperse the fibres in the particular asbestos-containing material. Less surfactant is required, for example, where the actual percentage of fibre in the asbestos-bearing material is reduced because of extraneous non-asbestos material such as grit and rock. Fibre concentrates or low grade short fibres require correspondingly more surfactant.

The preferred surfactants and surfactant concentrations for a particular asbestos-bearing material that is to be subjected to our process, can be established by simple laboratory experiments.

During the fiberising step (7) there is a further opportunity for the disengagement of fibrous particles from non-fibrous particles. Consequently, a second classification step (9) can be used with advantage to remove the non-fibrous particles or unopened fibre bundles from the circuit. Hydrocyclones are convenient devices for effecting this separation. It is necessary that the viscosity of the slurry of dispersed fibre from the fiberising step should be adjusted to a level enabling efficient functioning of pumps and classifying devices. This is carried out in a dilution step (8), the effectiveness of which is assisted by maintaining the concentration of the fiberising surfactant at a level which will not allow significant coagulation of the dispersed fibre. This concentration limit will depend on the particular surfactant or combination of surfactants used for fiberising and dispersing, but is approximately of the same magnitude as the critical micellar concentration for that surfactant or combination of surfactants, under the prevailing conditions of temperature and solution composition.

Prior to the next stage the slurry may be filtered or "squeezed" by suitable equipment to remove as much of the entrained surfactant solution as possible so that the amount of water at the dilution stage can be greatly reduced.

The dispersed fibres in the suspension are caused to coagulate (10) in the form of stringy agglomerates. Although the structure of these stringy agglomerates is not known in detail, we have found that they have properties which make them useful for reinforcing cementitious composition. Furthermore, fibre which is normally unsuitable for reinforcement of cementitious compositions because of the short length of low aspect ratio, when converted to stringy agglomerates by the process of our invention is unexpectedly found to have the desired reinforcement properties.

The coagulation of the fiberised dispersion can be effected in several ways. The dispersed slurry can be poured in a thin stream or pumped through jets into a large volume of water which is stirred gently with a circular motion. An alternative is to bring together in the correct volume ratios the streams of fibre slurry and diluting water by pumping both through a pipe, or a hydrocyclone for example.

The extent of dilution required for the coagulation stage is dependent in part on the concentration of surfactant in solution in the fiberised dispersion. In practice, it is desirable to keep to a minimum the amount of dilution required and the excess of surfactant used in fiberising. During the dilution additional surfactant enters the solution by desorption from the fibre surfaces. The preferred conditions of dilution for the production of the stringy agglomerates of our process are such that will give solids to water ratios in the range of 1:20 to 1:1500, preferably in the range of 1:70 to 1:400, and surfactant concentrations in the solution from 0.01 to 0.1% w/w. If the dispersed fibre slurry is partially diluted to facilitate transfer, e.g. by pumping, to the coagulation stage, the dilution ratio used in the coagulation stage is adjusted accordingly.

After coagulation it is convenient to further refine the fibre product in a third classification step (1) by removing residual dust, grit or other particles which can degrade the product quality. This classification can be carried out using hydrocyclones, for example.

The product is collected by dewatering (12) the slurry of coagulated fibre. This step may be carried out in one or more stages; for example, by vacuum or centrifugal filtration. With particular surfactants the solid will be sufficiently aerophilic to be separated by froth flotation. Indeed, the dewatering may be associated with the third classification step; for example, by employing a solid bowl centrifuge to recover product while allowing unwanted particles to pass out with the effluent solution; similarly a screen may be used as the first collection device for recovering the solid product. Additional dewatering can be achieved using a pressure filter, for example, according to the tolerable water control in the product.

The fibres may be subjected to further treatment, for example, the fibres may be treated with a solution of an alkaline reagent to modify the hydrophobic/hydrophilic balance of the fibre surfaces to suit the particular requirements of the asbestos user.

The nature of the alkaline reagent is not narrowly critical; an alkali hydroxide such as sodium hydroxide may conveniently be used. The ratio of sodium hydroxide to the fibre solids content may be selected to remove the desired amount of adsorbed surfactant. The quality of alkaline reagent required for this purpose can be determined by chemical analysis of a solution of the adsorbed surfactant by means of a suitable solvent such as methanol. It is desirable to avoid unnecessary excess of the alkaline reagent.

Similarly the agglomerated fibres from our process may be heated to modify the hydrophobic/hydrophilic balance to suit the requirements of a particular cementitious composition. The amount and nature of the adsorbed surfactant residues on the fibres can be modified in this way.

The fiberising surfactant is ultimately distributed in several streams; the fibre product itself contains surfactant, the various solids wastes each remove a proportion of the surfactant, and the process solution separated from the fibre a substantial fraction of the input surfactant. It is a particular feature of our invention that these separated process solutions can be treated by ultrafiltration means to increase the concentration of surfactant so that the treated solutions can be recycled to earlier stages or used for similar stages in subsequent batches.

The use of ultrafiltration technology for removing materials from solutions, or for concentrating solutions is well known. However the use of ultrafiltration technology for removal of surfactants from asbestos processing streams has not previously been considered because of the low molecular weight (usually <1000) of the commonly used surfactants.

Membranes which are suitable for the ultrafiltration of compounds of molecular weight 1,000 or less are known but are costly and difficult to use. Most of the membranes suitable for use in processes relating to the filtration of compounds in this molecular weight range are confined to small laboratory-type equipment. Furthermore such membranes suitable for use in processes relating to the filtration of compounds having molecular weights of 1000 or less require process conditions which give a high pressure across the membrane so as to produce a high flux value during the operation of the process. For the purposes of the present invention the term flux means the volume of permeate composition (as hereinafter described) passing through a unit area of membrane in a unit of time. High pressures, however, tend to lead to gel polarization on the membrane, thereby limiting the flux that can be achieved. Hence with low molecular weight cut-off membranes, filtration cannot readily be used in asbestos processing where large feed volumes and high permeate composition through-puts are involved.

Our invention resides in the surprising discovery that surfactant can be removed from surfactant-containing compositions from asbestos process, particularly solutions, by the use of membranes which have been designed specifically for the ultrafiltration of compounds having high molecular weights. For example, membranes designed to remove compounds of nominal molecular weights of 10,000 and above, have been found to be capable of separating surfactants of low molecular weight, for example a molecular weight of about 500, from solutions by processes according to the invention and wherein the differential pressures across the membrane were in a a range from 100 to 700 kilopascals.

The ultrafiltration membrane used in the process of the invention may be selected from those known in the art, for example those derived from hydrophobic polymers such as vinyl ethers and vinyl esters. These have the advantage of reduced swelling in water. Another type of suitable polymer with high water permeability and controllable porosity in film form is a polyelectrolyte complex, made by the coacervation of the salts of a polyacid mixed with a polybase. A typical membrane may be made from derivatives of polystyrene such as poly(sodium styrenesulphonate) and poly(vinylbenzyltrimethylammonium chloride). Membranes which have been designed originally for the ultrafiltration of compounds having molecular weights of above 1,000 and up to 30,000 are useful in our process. The preferred membranes are those which have been designed originally for the ultrafiltration of compounds having molecular weights in a range from 5,000 to 10,000. Such membranes are available commercially in a variety of shapes, typically as discs, sheets, tubes or spirals.

The efficacy of an ultrafiltration process for its capability to remove a component from a composition is often calculated on a quantitative basis from the concentration of the component in the composition before and after the composition is filtered. If the concentration of component in the composition before filtering (feed composition) is $x\%$, and the concentration in the composition after filtering (permeate composition is $y\%$, then the efficacy of the process is defined as $(1-y/x)$. The greater the value of $(1-y/x)$, the more efficient is the process.

In contradistinction to conventional ultrafiltration processes wherein an increase in the value of x usually leads to a marked decrease in the flux value, it has been found that the process of the invention does not suffer from this disadvantage. By contrast it has been found advantageously that in the process of the invention the value of x can be increased significantly without there being a significant reduction in either the flux value or the efficiency value $(1-y/x)$.

The process of the invention is particularly useful for the treatment of surfactant-containing solutions from the asbestos process described hereinbefore, wherein said solutions contain small concentrations of surface active agent material for example as small as 0.01 to 0.1% w/w, and, dependent to some extent on the nature of the surfactant component and the capabilities of the ultrafiltration means employed, compositions containing relatively large concentrations of surfactant materials up to about 10% w/w, and usually from 0.1 to 5% w/w, can be prepared and re-used as surfactant-bearing compositions suitable for earlier steps in the asbestos processes.

A further advantage of the process of the invention lies in its ability to purify the surfactant. Since the surfactant is effectively retained by a membrane which was designed for use with compounds of a higher molecular weight than the surfactant itself, then lower molecular weight contaminents in the composition, which unlike the surfactant component do not exhibit the unusually and unexpected property of being retained by the membrane, are separated from the feed composition and are transferred to the permeate composition.

A still further advantage of the process lies in the fact that the permeate composition obtained thereby can be treated and used as a source of a recyclable aqueous medium useful in the process of the invention.

Some of the surfactant-containing solutions that are to be treated by ultrafiltration will contain short fibre and dust in suspension, for example, solutions from steps (9) and (11) previously described. With any such solutions containing suspended matter it will usually be advantageous to filter such solutions to remove suspended matter prior to ultrafiltration. In this way clogging of the ultrafiltration membranes can be avoided.

The invention is now illustrated by, but is not limited to, the following examples in which all parts and percentages are on a weight basis unless otherwise specified.

EXAMPLE 1

Figure 1:
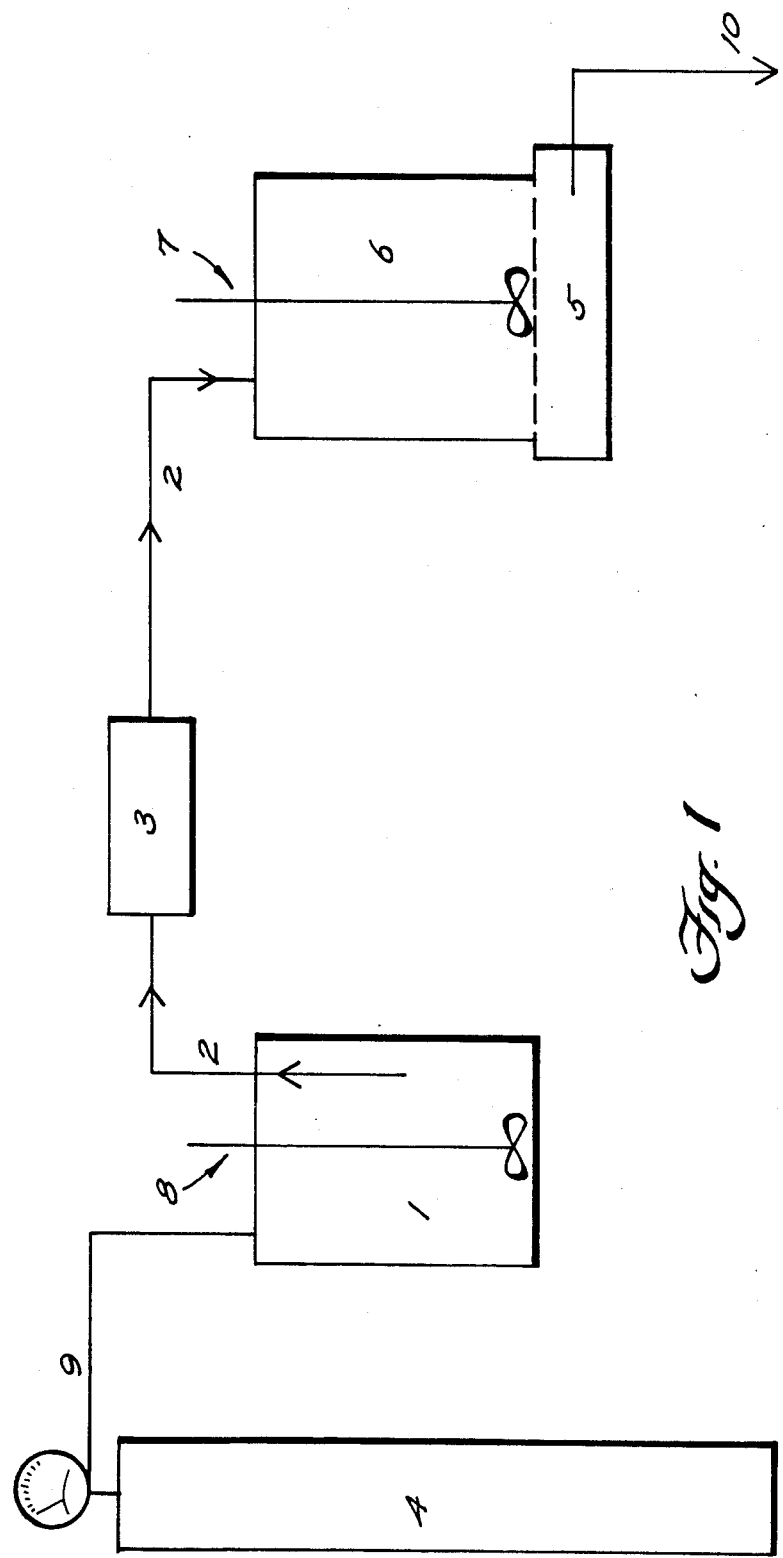
FIG. 1 is a block form diagram of laboratory scale apparatus used in the present process.

A first effluent composition derived from an asbestos recovery process and containing a surfactant, sodium dioctylsulphosuccinate, is treated in a laboratory scale apparatus comprising an ultrafiltration unit so as to separate a proportion of the surfactant from the first composition and to provide a permeate composition which is poorer in surfactant material than was the first composition. The apparatus used in the process and referred to in the description is depicted in block form in FIG. 1.

A storage tank 1 fitted with a magnetic stirrer 8 was filled with a feed aqueous solution containing 0.076% of "Matexil" WA-OT. ("Matexil" is a registered trade name for a surfactant composition containing 50% of sodium dioctylsulphosuccinate). Stirrer 8 was activated and compressed air obtained from air-cylinder 4 was fed through conduit 9 to tank 1 so as to transfer the solution in tank 1 through conduit 2 to heat exchanger 3 wherein it was heated to a temperature of 23° C. and was then transferred through conduit 2 to a stirred cell 6 fitted with a magnetic stirrer 7 and a membrane 5. The membrane 5 was was a product which was commercially available under the designation "Amicon" PM10 and was stated by the manufacturers to have a molecular weight cut off of 10,000. The area of membrane 5 was 15 square centimeters. The feed solution from tank 1 provided a permeate composition which flowed through and was recovered from conduit 10 at a rate of approximately 1 milliliter per minute over a period of 50 minutes. During the time when the process was being performed, a composition which was richer in surfactant than was the feed solution and which did not pass through membrane 5 was accumulated in stirrer cell 6. During the operation of the process the differential pressure across the membrane was 100 kilopascals and the flux value averaged 0.065 cm$^3$/cm$^2$/ minute. The permeate composition contained 0.014% of sodium dioctyl-sulphosuccinate. The efficiency of the process was 0.63.

EXAMPLES 2 TO 4 INCLUSIVE

The general procedure of Example 1 was repeated except that the concentration of the sodium dioctylsulphosuccinate in the feed composition, and the differential pressure across the membrane was varied as shown in Table 1 which also shows the concentration of sodium dioctylsulphosuccinate in the permeate composition, the flux value and the efficiency of the process.

TABLE 1

| Example No | Sodium dioctylsulpho-succinate Expressed as % "Matexil" WA-OT | | Pressure Kilo-pascals | Flux value 1/m$^2$/hr | Efficiency |
| --- | --- | --- | --- | --- | --- |
| | Feed Composition | Permeate Composition | | | |
| 2 | 0.096 | 0.041 | 100 | 38 | 0.57 |
| 3 | 0.036 | 0.016 | 300 | 96 | 0.56 |
| 4 | 0.096 | 0.020 | 100 | 111 | 0.79 |

EXAMPLES 5 TO 11 INCLUSIVE

Figure 2:
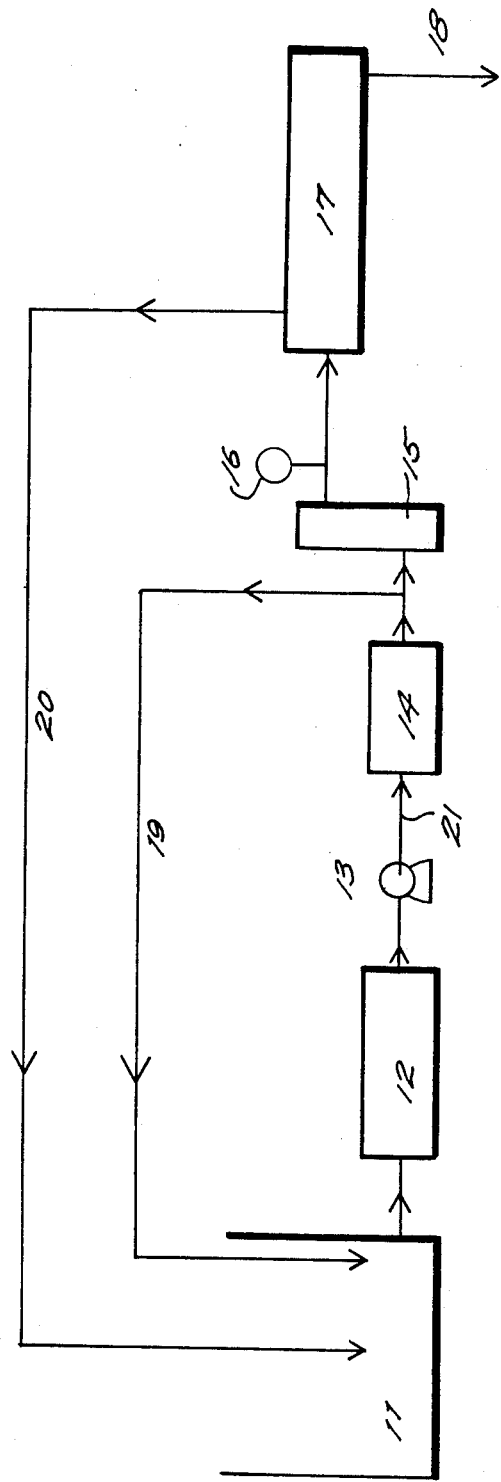
FIG. 2 is a block form diagram of pilot plant scale apparatus used in the present process.

In these examples there is used an apparatus wherein a process of the invention is performed on a pilot plant scale and in which process a feed composition is circulated at a temperature of 26° C. at a flow rate of 18 liters per minute at pressure to an ultrafiltration module containing an ultrafiltration membrane, which had an area of 1 square meter and was stated by the makers thereof (Westinghouse) to have a molecular weight cut off of 10,000, to provide a permeate composition. The apparatus used in the process and referred to in the description is depicted in block form in FIG. 2. In each of the examples a feed composition containing sodium dioctylsulphosuccinate was located in a tank 11 which was of 180 liters capacity. The feed composition was circulated from tank 11 by means of pump 13 through conduit 21 so that it passed through a coarse filter 12, then through a heat exchanger 14, and thereafter the feed composition was split whereby a first portion was recirculated through conduit 19 to tank 11 and a second portion was circulated through a rotameter 15 at a desired pressure indicated by pressure gauge 16 to an ultrafiltration module 17 wherein the second portion of the feed composition was subjected to an ultrafiltration treatment to provide a third portion which was richer in surfactant than was the feed composition and which was recirculated through conduit 20 to tank 11, and a permeate composition which flowed through and was recovered from conduit 18. In Table 2 there is set out the concentration of sodium dioctylsulphosuccinate in the feed composition and in the permeate composition obtained after the process had been performed for 25 minutes and the conditions of operation had become stabilized, the flux value, the differential pressure across the membrane, and the efficiency of the process.

The feed compositions of this series of Examples were derived from a process wherein asbestos fibre was obtained from asbestos rock. In Example 5 asbestos rock was crushed and sieved and that portion which passed a 10 mesh screen was wet ball milled and classified by wet screening and gravity separation. The concentrate so obtained was added to a hot aqueous solution containing 2.5% w/w of sodium dioctylsulphosuccinate, and the mixture was subjected to shear stirring and then dilute with hot water. The slurry so obtained was decanted from an amount of settled grit and filtered to recover asbestos fibres. The filtrate so obtained formed the basis of the feed composition. In Example 6 the same feed composition was used but the pressure used in Example 5 was increased. In Examples 7 to 11 the feed compositions were those resultant of the recirculation of the third portions referred to above and obtained in Examples 6 to 10 successively through conduit 20 to tank 11. The surfactant-enriched third portion obtained from Example 11 was not recirculated to tank 11, but was recovered and used as a surfactant-bearing processing aid to recover asbestos fibre from asbestos-bearing material.

TABLE 2

| Example No | Sodium dioctylsulpho-succinate Expressed as % "Matexil" WA-OT | | Pressure Kilo-pascals | Flux value 1/m$^2$/hr | Efficiency |
| --- | --- | --- | --- | --- | --- |
| | Feed Composition | Permeate Composition | | | |
| 5 | 0.0338 | 0.010 | 200 | 22 | 0.70 |
| 6 | 0.0338 | 0.015 | 300 | 65 | 0.56 |
| 7 | 0.041 | 0.0196 | 300 | 62 | 0.52 |
| 8 | 0.131 | 0.042 | 250 | 36 | 0.68 |
| 9 | 0.382 | 0.063 | 250 | 36 | 0.84 |
| 10 | 0.89 | 0.120 | 250 | 34 | 0.87 |
| 11 | 1.50 | 0.230 | 250 | 32 | 0.85 |

EXAMPLE 12

Asbestos fibre was obtained by the general procedure of Example 5 except that in the present Example the sodium dioctylsulphosuccinate of Example 5 was replaced by a mixture of surface active agents such that the hot aqueous solution contained 2.5% w/w of sodium dioctylsulphosuccinate and 0.5% w/w of dodecylbenzene sulphonic acid. When the feed compositon derived from this process was subjected to an ultrafiltration step similar to that used in Example 5 a surfactant-enriched third portion was obtained.

EXAMPLES 13-16

The general procedure of Example 2-4 was repeated except that a commercially available cellulose acetate membrane stated to have a molecular weight cut off of 1,000 was used. The results are given in Table 3.

TABLE 3

| Example No | Sodium dioctylsulpho-succinate Expressed as % "Matexil" WA-OT | | Pressure Kilo-pascals | Flux value l/m²/hr | Efficiency |
| --- | --- | --- | --- | --- | --- |
| | Feed Composition | Permeate Composition | | | |
| 13 | 0.024 | 0.008 | 340 | 12 | 0.67 |
| 14 | 0.029 | 0.015 | 408 | 11 | 0.48 |
| 15 | 0.034 | 0.023 | 544 | 16 | 0.32 |
| 16 | 0.023 | 0.010 | 680 | 20 | 0.57 |

EXAMPLES 17–19

The general procedure of Examples 2–4 was repeated except that a commercially available cellulose acetate membrane stated to have a molecular weight cut off of 10,000 was used. Results are given in Table 4.

TABLE 4

| Example No | Sodium dioctylsulpho-succinate Expressed as % "Matexil" WA-OT | | Pressure Kilo-pascals | Flux value l/m²/hr | Efficiency |
| --- | --- | --- | --- | --- | --- |
| | Feed Composition | Permeate Composition | | | |
| 17 | 0.0048 | 0.002 | 544 | 231 | 0.58 |
| 18 | 0.0048 | 0.0018 | 270 | 95 | 0.63 |
| 19 | 0.0018 | 0.001 | 270 | 39 | 0.44 |

EXAMPLES 20–21

The general procedure of Examples 2–4 was repeated except that the membrane used had a commercial designation of DDS GRGD and was stated by the manufacturer to have a molecular weight cut off above 20,000. The results are given in Table 5.

TABLE 5

| Example No | Sodium dioctylsulpho-succinate Expressed as % "Matexil" WA-OT | | Pressure Kilo-pascals | Flux value l/m²/hr | Efficiency |
| --- | --- | --- | --- | --- | --- |
| | Feed Composition | Permeate Composition | | | |
| 20 | 0.4 | 0.048 | 270 | 10 | 0.88 |
| 21 | 0.47 | 0.06 | 270 | 13 | 0.87 |

We claim:

1. A process of separating asbestos fibre from asbestos-bearing material which process comprises the steps:
   (a) forming a viscous slurry dispersion of asbestos fibres by contacting asbestos-bearing material with a solution containing a surfactant adsorbable on or reactable with asbestos,
   (b) agglomerating said dispersion,
   (c) classifying to separate a first surfactant composition from agglomerated asbestos fibres,
   (d) filtering said first surfactant composition with ultrafiltration means to provide a second surfactant composition and a permeate composition, and wherein the ultrafiltration means comprise a membrane filter with a molecular-weight cut-off in a range from 1,000 to 30,000, and
   (e) re-using the said second surfactant composition in step (a).

2. A process according to claim 1 wherein the molecular weight cut off is in a range from 5,000 to 10,000.

3. A process according to claim 1 wherein the differential pressure across the membrane is in a range from 100 to 700 kilopascals.

4. A process according to claim 1 wherein the membrane is selected from the group consisting of hydrophobic polymers and polyelectrolyte complexes.

5. A process according to claim 4 wherein the hydrophobic polymer is selected from the group consisting of polyvinyl ethers and polyvinyl esters.

6. A process according to claim 4 wherein the polyelectrolyte complex comprises poly(sodium styrenesulphonate) and poly(vinylbenzyltrimethylammonium chloride).

7. A process according to claim 1 wherein the concentration of the first surfactant composition is at or below 1.5% w/w.

8. A process according to claim 7 wherein the concentration is in a range from 0.01 to 0.1% w/w.

9. A process according to claim 1 wherein the asbestos-bearing material is treated with a second surfactant composition in a wet crushing step prior to forming the dispersion.

10. A process according to claim 1 wherein the surfactant compositions comprise aqueous solutions.

11. A process according to claim 1 wherein the surfactant of step a) comprises an anionic surfactant selected from the group consisting of carboxylates, N-acylsarcosinates, alkanesulphonates, linear and branched alkylarylsulphonates, dialkyl sulphosuccinates, arylsulphonates, naphthalenesulphonates, N-acyl-N-alkyl-laurates, 2-sulphoethyl esters of fatty acids, olefin sulphonates, alkyl sulphates, sulphated natural oils, sulphated alkylphenol alkoxylates, and phosphate esters of alkanols and phenol and alkylphenol alkoxylates.

12. A process according to claim 11 wherein the sulphosuccinates are selected from the group consisting of sodium dihexyl sulphosuccinate, sodium di(isobutyl)sulphosuccinate, sodium dioctylsulphosuccinate, magnesium dioctylsulphosuccinate, disodium N-octadecyl-sulphosuccinamate, tetrasodium N-(1,2-dicarbethoxyethyl)-N-octadecyl sulphosuccinamate, and the sodium sulphosuccinate esters of lauric mono- and di-ethanolamides or of ethoxylated lauryl or decyl alcohols, and wherein the alkylarylsulphon tes are selected from the group consisting of dodecylbenzenesulphonic acids and derivatives thereof.

13. A process according to claim 1 wherein the surfactant of step a) comprises a non-ionic surfactant selected from the group consisting of fatty acid esters, ethoxylated aliphatic alcohols and alkylphenols, alkoxylates, fatty acids and fatty acid amides, and natural fats and oils.

14. A process according to claim 13 wherein the aliphatic alcohols are selected from the group consisting of ethylene glycol, propylene glycol, glyercol, diethylene glycol, oleyl alcohol, lauryl alcohol, cetyl alcohol, stearyl alcohol, tridecyl alcohol, myristyl alcohol, trimethylnonyl alcohol, primary $C_{12}$–$C_{13}$ and $C_{12}$–$C_{15}$ alcohols, secondary $C_{11}$–$C_{15}$ alcohols, tallow, sorbitan, and polyethylene glycol, the alkylphenols are selected from the group consisting of nonylphenol, dodecylphenol, octylphenol, isooctylphenol, and $C_8$–$C_{12}$-alkyl-phenols, the fatty acids are selected from the gfoup consisting of lauric acid, stearic acid, oleic acid, coco acid, capric acid and myristic acid, ricinoleic acid, and acids derived from tall oil, soybean oil, resin, tallow, lard, cottonseed, and safflower oil, and the amines used to prepare the fatty acid amides are selected from the group consisting of ethanolamine, diethanolamine, and isopropanolamine.

15. A process according to claim 1 wherein the surfactant of step a) comprises a cationic surfactant selected from the group consisting of aliphatic mono-, di-, and poly-amines, amine salts, amine oxides of the general formula

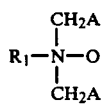

wherein A is hydrogen or hydroxyl, and $R_1$ is selected from the group consisting of cetyl, lauryl, myristyl, stearyl, coco, decyl, hexadecyl and octadecyl, ethoxylates of alkyl and alicyclic amines, 2-alkyl-1(hydroxyethyl)-2-imidazolines, tetrakis-substituted ethylenediamines, amide-linked amines of the general formula

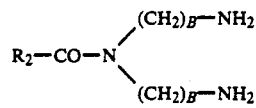

wherein $R_2$—CO—N is derived from the group consisting of coconut, oleic, stearic, and tall oil acids, and B is 2 or 3, and quaternary ammonium salts.

16. A process according to claim 12 wherein the surfactant comprises sodium dioctylsulphosuccinate.

17. A process according to claim 12 wherein the surfactant comprises dodecylbenzenesulphonic acid.

18. A process according to claim 1 wherein the said dispersion is subjected to mechanical agitation prior to agglomeration.

19. A process according to claim 1 wherein the dispersion is agglomerated by addition of a permeate surfactant composition.

20. A process according to claim 1 wherein the said asbestos-bearing material is selected from the group consisting of crude ore, fibre concentrates from dry or wet processes, mine wastes and tailings.

21. A process according to claim 1 wherein the said asbestos-bearing material comprises low grade short fibre.

22. A process according to claim 1 wherein the said asbestos-bearing material is subjected to crushing and grinding, optionally with classification, prior to formation of the dispersion.

* * * * *